United States Patent [19]
Herbst, Sr.

[11] 4,079,761
[45] Mar. 21, 1978

[54] BATTERY WATER FILLING DEVICE

[76] Inventor: Clarence A. Herbst, Sr., 155 Berry Pkwy., Park Ridge, Ill. 60068

[21] Appl. No.: 552,543

[22] Filed: Feb. 24, 1975

[51] Int. Cl.$^2$ .............................................. B65B 3/26
[52] U.S. Cl. .................................. 141/198; 137/261; 141/237; 141/292
[58] Field of Search ................ 141/1, 39, 40, 46, 198, 141/291, 292, 295, 296, 301, 302, 308, 309, 351–353, 363, 236, 237, 244; 222/457; 136/162; 137/260, 261, 453

[56] References Cited

U.S. PATENT DOCUMENTS

| 1,361,437 | 12/1920 | Blau | 136/162 |
| 1,506,172 | 8/1924 | Fredette | 137/261 |
| 3,460,590 | 8/1969 | Robbins | 141/352 X |
| 3,606,096 | 9/1971 | Campbell | 141/292 X |

FOREIGN PATENT DOCUMENTS 530,830  8/1931  Germany .......................... 136/162

Primary Examiner—Richard E. Aegerter
Assistant Examiner—Frederick R. Schmidt
Attorney, Agent, or Firm—Wegner, Stellman, McCord, Wiles & Wood

[57] ABSTRACT

A container for dispensing water into the cells of an electric storage battery and/or simultaneously into several cells, for example, in to all three cells of a 6 volt electric storage battery, from a container having a common water supply, the dispensing occurring through valved fill spouts which may be opened upon moving the container toward the battery with the spouts in the cells of the battery and providing structure whereby water in each cell will stop flowing from the container into the cell when the water rises in the cell to a level sealing the end of the dispensing spout.

4 Claims, 8 Drawing Figures

U.S. Patent     March 21, 1978     Sheet 1 of 2     4,079,761
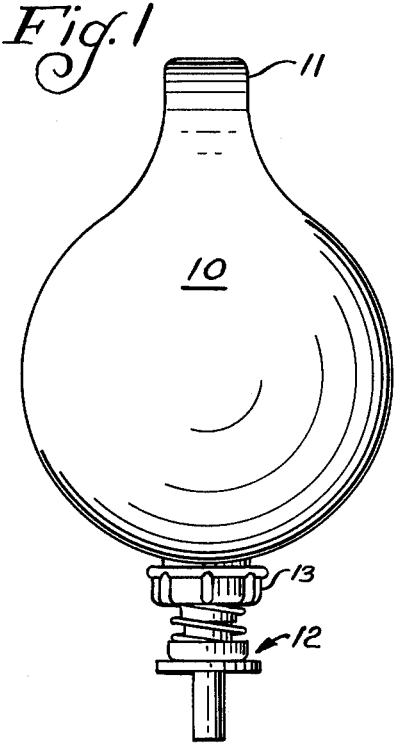
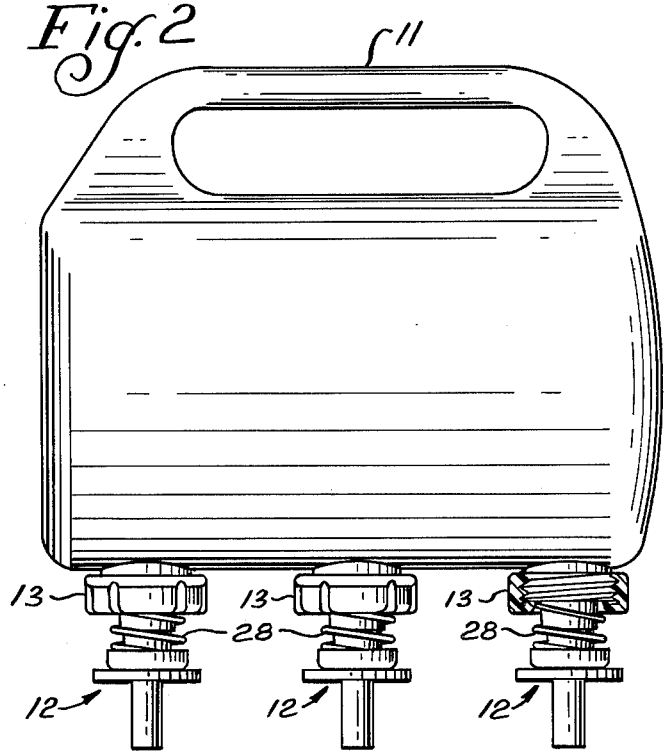
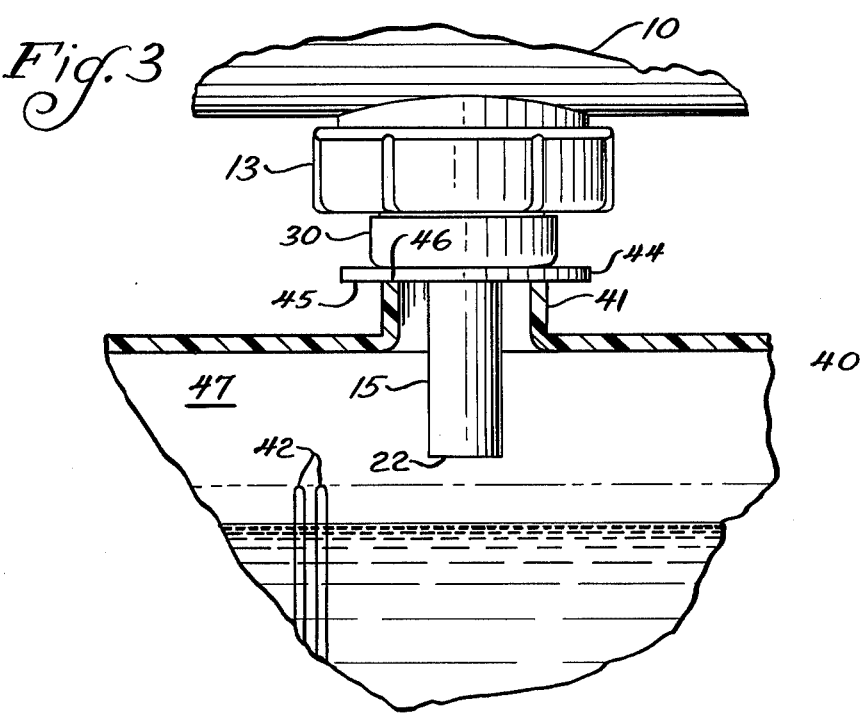

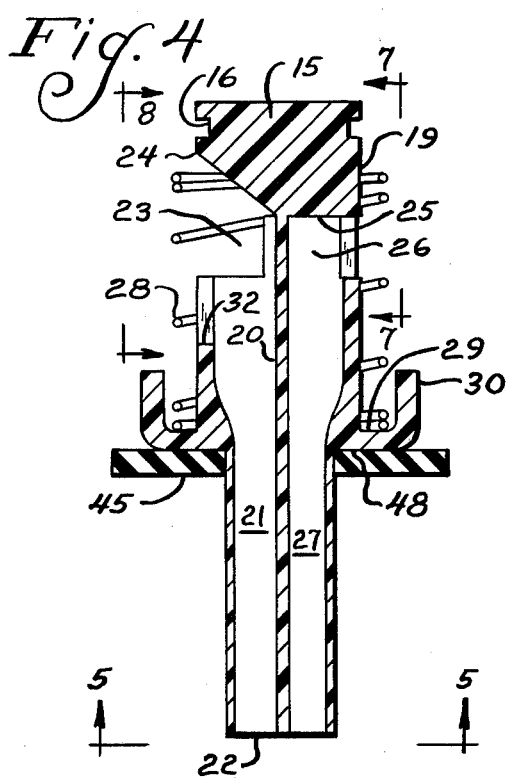
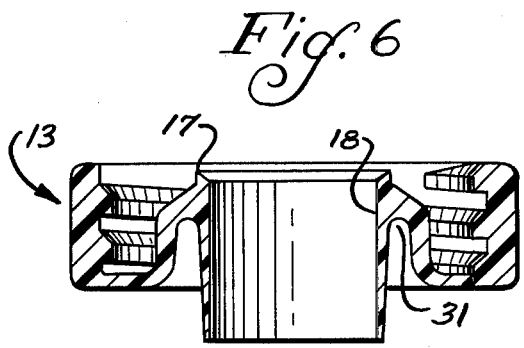
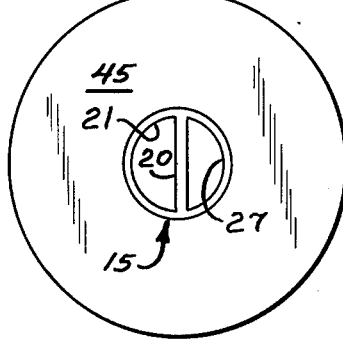
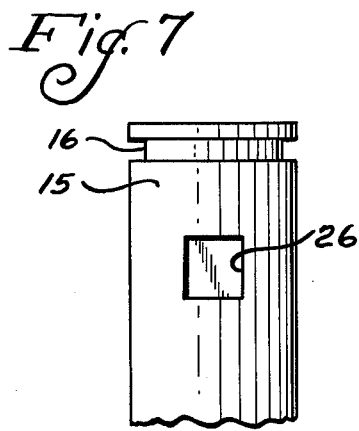
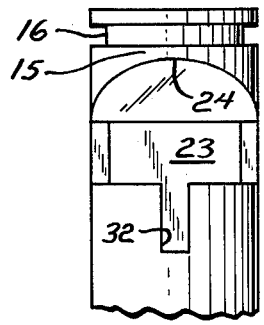

BATTERY WATER FILLING DEVICE

BACKGROUND OF THE INVENTION

This invention relates to devices for filling electric storage battery cells with either water or other fluid appropriate to make the cell operative and to bring the water level in the cell to a proper height covering the plates. The term "water" as used herein includes all such liquids.

In the gasoline filling stations common throughout the United States, there have been provided a pitcher-like closed container having a valved fill spout thereon which may be inserted individually into each open cell nozzle to dispense liquid into the cell of the battery. The construction of the fill spout is such that the valve therein may be opened by manually moving the container toward the battery with the fill spout in the cell nozzle. Water will flow from the container cell until the water in the cell rises to close off the end of the spout, thus giving an automatic level proper for the particular cell being filled, and when the spout is thus covered, flow will stop. It is believed that the container from which the water is dispensed is a closed circuit with the cell in such a fashion that once the water rises to close the end of the spout a slight vacuum may occur above the water in the container, thus stopping the flow. Retraction of the container from the battery closes the valve in the spout, thus preventing spilling of any quantity of water except into the cell of the battery.

A greater number of batteries used in the United States are of the 6 volt variety containing three cells, each with is own fill nozzle. Other batteries of other voltages are common in automobiles, such as the 12 volt battery which has six cells, each with its own fill nozzle. Throughout industry, many of the 6 volt batteries are still in widespread use, such as industrial trucks, golf carts and the like. Battery life can be extended appreciably if proper water levels in each of the cells of the battery is maintained. Industry and users of the batteries, therefore, have a problem of maintaining the batteries in the proper operating condition, particularly with respect to maintaining the water level in the cells The individual placement of water into each cell is a time-consuming operation. It was, therefore, thought that time of maintenance could be reduced if all three cells of an individual battery could be filled simultaneously. The utilization of known assembly spout battery filling devices, however, does not permit the filling of all three cells from a common source without the present invention.

The use of three conventional fill spout structures, each with its spout on a common container will not stop the flow of water into the cells until the last to be filled of the cells has reached the proper level. The cell which does not need water will overflow while the other cells of the battery are receiving water from the common container, so that the use of conventional fill spout structures does not satisfy the need to stop the flow into each cell when the water level in that cell reaches proper height.

SUMMARY OF THE INVENTION

It is the principal object of this invention to provide new and improved fill spout structure for a water dispensing container utilized to put water into the cells of an electric storage battery at the proper level.

Another object of the invention is to provide a simple, economical modification of conventional fill spout structures for battery water fillers, to permit multiple dispensing from a common container of water into the multiple cells of an electric storage battery.

It is a further object to allow the dispensing of water into electric storage battery multiple cells simultaneously from a container which is not closed, but may be open to atmosphere above the water in the container which is used for transfer to the cells of the battery.

The foregoing objects of this invention are achieved primarily by the provision of a structure which can seal the cell of the electric storage battery in such a fashion as to close off the interior of the cell from the exterior atmosphere, thus providing a pneumatic head above the water in the cell utilized to stop the flow of water from a container into the battery cell so that a number of cells may be supplied with water from a common container and the water will rise in each cell only to a proper level therein and whereupon flow from the common container will stop as to that particular cell.

DESCRIPTION OF THE DRAWINGS

FIG. 1 is an end elevational view of a container for battery water with a dispensing spout at the lower end and a handle at the top;

FIG. 2 is a side elevational view of the container shown in FIG. 1 illustrating three spouts in position to be inserted into the three cells of a 6 volt electric storage battery;

FIG. 3 is a fragmentary enlarged view of one of the spouts shown in FIGS. 1 and 2 inserted into a battery fill nozzle shown diagrammatically;

FIG. 4 is a fragmentary vertical sectional view through the spout shown in FIG. 3;

FIG. 5 is an end view of that end of the spout inserted into the battery taken from the bottom of FIG. 4;

FIG. 6 is a cross sectional view of the screw-removable nut holding the fill spout assembly to the container;

FIG. 7 is a fragmentary elevational view looking toward the left in FIG. 4 where indicated; and FIG. 8 is a fragmentary view looking toward the right in FIG. 4 where indicated.

Referring to FIGS. 1 and 2 of the drawings, a filling container 10 having a handle 11 for manipulation by a servicing personnel is shown as having three spouts 12 at the lower end, each of which is attached to the container by removable nut 13 better shown in section in FIG. 6. The container 10 may hold a gallon or two of water for convenient filling of the cells of a 6 volt battery which generally has three such cells. A closed container is preferred to avoid spilling during handling. Each of the spouts 12 are positioned on the bottom of the container to receive water from the interior of the container and deliver the same into the cells of the battery simultaneously. The container may be a plastic material so that it is lightweight and the removal of any one of the plastic nuts holding the spouts to the container would reveal a male threaded boss through which the container may receive a quantity of a gallon or so of water or other appropriate liquid for insertion into the cells of an electric storage battery. Other configurations of the location of the spouts can be chosen to fit electric storage batteries of other than 6 volt type, the three-spouted container being shown for purposes of illustration.

With the container containing a quantity of water and each of the spouts in position on the bottom of the container as illustrated in FIGS. 1 and 2, the container is a closed system although, a container open to the atmosphere above the water level is operative with the present invention. Water may be dispensed from the container through the spouts only upon movement of the container toward a battery to raise the lower portion of the spouts relative to the container, thus opening the valves which are incorporated in the spout structure.

The construction of the spout in its conventional form and as modified to incorporate this invention is best illustrated in FIGS. 4 to 8. The spout has a plastic plunger member 15 with an O-ring groove 16 at the top, for receiving an O-ring for seating upon a valve seat 17 in the plastic retaining nut 13. A circular, cylindrical bore 18 in the nut slidingly receives the smooth outer surface 19 of the plastic spout 15. The spout has two columns on either side of a dividing rib 20, best illustrated in FIGS. 4 and 5. A column 21 shown on the left-hand side of FIG. 4 exits at the bottom end 22 of the spout and rises through the spout to a relatively large opening 23 which has its upper end 24 higher than the upper end 25 of an opening 26 on the right-hand side of the spout as illustrated communicating the column 27 with the lower end 22 of the spout.

The spout structure 15 is maintained in an extended position relative to the retaining nut 13 by a spring 28 which seats in a spring set 29 provided in a flange 30 which extends out from the structure of the spout and then upwardly to retain the lower end of the spring. The spring's upper end seats in a spring seat 31 provided in the retaining nut 13. This spring is a compression spring, lightweight in character, but sufficiently strong to urge the spout structure 15 outwardly from the retaining nut 13 so that an O-ring seated in the O-ring groove 16 may perform its valving function by seating against the seat 17 the upper end of the smooth bore 18 in the nut holding the spout structure for reciprocation therein.

It is believed that the conventional spout structure provides liquid flow from a container, such as the container 10, through the channel 21 so that air may escape upwardly into the container through the channel 27. Channel 21 opening first provides liquid flow from the container and air in the battery cell may thus escape up through the channel 27 into the container until such time as water in the battery cell would rise to close the lower end 22 of both channels 21 and 27. Further rise of water in the battery cell is prevented at that point by a slight vacuum created above the water level in the closed container. The conventional battery filling containers are a closed system as described in order to allow the water in the cell to rise only to the lower end of the spout and then stop flow. When the container is lifted out of the battery, the spring 28 acts to close the spout so that only water in the channel 21 and any water in the channel 27, which is very small in quantity, would immediately flow into the cell preventing any drip or spillage of the contained water over the outside surface of the battery as the container is lifted out of the battery and out of dispensing condition. Slot 32 in the side of channel 21 is exposed to atmosphere when the valve O-ring is seated to insure that any water in channel 21 will flow into the battery as the container is lifted out of dispensing condition.

Experiments with conventional assembly spout battery filling structures have indicated three such conventional spouts on a common water supply, such as a container 10, will not prevent overflow of some cells while other cells are still receiving water from the common supply. It is believed that the reason for the overflow is the fact that so long as air can be admitted through one spout structure into the container, water will continue to flow through all of the spout structures. Therefore, conventional spout structures cannot be used in multiples with a common water supply container to simultaneously fill more than one cell, for example, all three cells of a 6 volt electric storage battery.

The present invention provides a simplified structure for allowing simultaneous flow of battery water into all cells of the battery from a common supply. Referring to FIG. 3, the fill container is shown in a position with one spout in a cell of the battery, it being understood that in the structure illustrated in FIGS. 1 and 2, three such spouts would be simultaneously inserted into the three cells of the battery to dispense water from the container into all three cells simultaneously. The existing water level in a battery cell may vary from cell to cell and thus one cell may require more water from the container than another cell. In FIG. 3, the battery 40 has a battery cell fill nozzle 41, generally of a standard 1 inch outer diameter size. The fill container 10 is positioned so that the spout 15 can extend through the fill nozzle on the battery with considerable looseness since the outer diameter of the fill spout is smaller than the inner diameter of the battery cell fill nozzle. In the condition illustrated in FIG. 3, the spouts have been inserted in the battery so that the end 22 is generally above the upper end of the plates illustrated diagrammatically at 42, with the desired result being, that water from the container 10 will flow through the spout until it rises to close off the lower end 22. At that time, the level of water in the battery would be at a proper desired height in the cell. The spring seat flange 30 on the spout structure has moved upwardly toward the screw removable nut 13 compressing the spring 28 and opening the valve into the spout by moving the O-ring in the O-ring groove 16 upwardly away from the seat 17, constituting the valve seat for the O-ring. In this condition, water may start to flow from the container through the opening 23 and down the column 21 into the battery. Ordinarily, air that is displaced inside the battery cell would exit through the column 27 and opening 26 into the container 10.

As more than one cell is being filled, such as three cells in a 6 volt battery, air from each of the cells may be exiting the cell through the column 27 into the container 10 and so long as air can enter the container 10 through any one of the channels 27, water will continue to flow downwardly through the column 21.

In order to stop the flow in any individual cell of the battery when the water level in that cell reaches the proper level, a rubber washer 44 is mounted on the spout structure against the spring seat flange 30 in a position to seal its lower surface 45 against the upper end 46 of the battery fill nozzle. A soft resilient washer has been found satisfactory for this purpose. The washer is adhered or otherwise caused to unite with its mating surfaces about the nozzle and against the spring flange member 30 in order that no air may pass between the nozzle and the washer. The lower surface 45 of the washer is of sufficient size and outward extent to seat throughout 360° against the upper end 46 of the battery cell fill nozzle even though it is obvious that the spout 15 is much smaller than the nozzle and thus might be moved or placed laterally from side to side within the battery cell fill nozzle. The fill nozzle may indent into the seal to insure such 360° sealing. The sealing which occurs between the rubber washer and the battery cell fill nozzle causes the space 47 above the plates in the cell to become a closed space.

When the water rises in the cell 40 of the battery to close off the lower end 22 of the spout, and further water from the container 10 tends to flow through the column 21 into the cell, a pressure rise in the space 47 above the plates will occur. This pressure rise can balance the water in column 21 and thus stop the flow of water from the container into the cell automatically when the proper level has been reached, that is, when the water has closed the end of the fill spout.

It is comprehended within the invention that the rubber washer may be a separate item manufactured with an opening in the middle to fit tightly about the outer diameter of the spout 15 and adhesively secured to the spout and to the spring seat flange along their interface 48. Alternatively, a soft resilient coating may be provided on the underside of the spring seat flange 30 of sufficient thickness and outward extent to insure 360° sealing with the top 46 of the battery cell fill nozzle regardless of position of the spout within that nozzle and to provide a sealing against air passage out of the cell to the atmosphere past the upper end of the battery cell fill nozzle. Any such structure provided either by a relatively resilient thick coating or a rubber washer is sufficient so long as it seals under the action of the spring 28 and the force provided by a person bodily moving the container 10 toward the battery in order to open the valves allowing water to flow through the spouts into the cell. In a three cell battery having different demands for water to fill each cell to the proper level, each cell will receive only that quantity of water necessary to raise the water level to the end of the spout 22 whereupon flow will stop into that cell while others are still receiving water from the container. Upon upward manual removal from the container, first movement closes the spout assembly valves. A quantity of battery water in column 21 will flow into the cell immediately, but this quantity is insufficient to overfill the cell.

From the foregoing it will be appreciated that a relatively simple solution to the problem of filling more than one cell of an electric storage battery from a common water supply while avoiding overflow of the water into any one of the cells is accomplished by the present invention.

I claim:

1. In a water filling container for multi-celled electrical storage batteries, the container having a valved water dispensing two-column fill spout for each battery cell with one column receiving water from a common supply in the container and the other column venting air from the cell through the spout, means for automatically stopping flow from the container through the fill nozzle into each cell when the water rises in such cell to cover the end of a fill spout, comprising:

a plurality of said two-column spouts on the container, one for each cell positioned for simultaneous insertion into the battery cell fill nozzle of an equal plurality of cells of the battery, a resilient washer-shaped seal about the exterior of each spout sealed to the spout to prevent air passage between the seal and spout, said seal having a surface engageable with the battery fill nozzle in air-sealing relation thereto and said seal being impervious to air passage therethrough between the spout and the battery fill nozzle to trap air in the battery cell halting flow of water into the cell when the water covers the end of the fill spout air venting column therein.

2. The means for stopping flow into the battery cell as specified in claim 1, in which each washer-shaped seal has a thickness dimension in the direction of the length of the spout permitting indentation of the battery cell nozzle thereinto with the force applied to open said valves in the fill spouts sealing each battery cell from communication with external atmosphere during water transfer from the container into the cells.

3. Means for stopping flow of water from a container into a battery cell as specified in claim 1, in which said fill spout two columns have openings into the battery cell at a common level so that rising water in the cell may close said air venting column and trap air in the cell between said washer-shaped seal and the water surface in the cell, said trapped air in the battery cell increasing in pressure when the water level covers said spout so that such pressure within the cell may balance the pressure of the column of water in said spout and filling container to stop said flow of water into the cell.

4. A water dispensing container for simultaneously filling a plurality of cells of a multi-celled electricl storage battery comprising:

container means defining a common supply for water for said plurality of cells to be filled, a plurality of fill spouts in fluid communication with said container means and adapted to be simultaneously introduced into the fill openings of the cells of a battery;

an air venting passage associated with each fill spout and having an opening positionable within a cell with the associated fill spout to vent air from the cell until the liquid level therein rises sufficiently to cover said opening; and means for independently halting the flow of water from said common supply through each fill spout when the cell into which it may be introduced is filled to a predetermined level including sealing means on each spout sealingly engaging the associated spout and adapted to sealingly engage the battery about the entire periphery of the fill opening of the cell into which the associated fill spout may be introduced for establishing a gas-tight seal between said fill opening and said spout, whereby when the level of liquid in each cell rises to cover the associated air venting passage opening, air will be trapped within the associated cell to generate a back pressure therein halting the flow of water through the associated fill spout independently of the liquid level of other cells being filled from said common supply.

* * * * *